United States Patent
Kessler

(10) Patent No.: US 10,153,088 B2
(45) Date of Patent: *Dec. 11, 2018

(54) CAPACITOR, IN PARTICULAR INTERMEDIATE CIRCUIT CAPACITOR FOR A MULTI-PHASE SYSTEM

(71) Applicant: Robert Bosch GmbH, Stuttgart (DE)

(72) Inventor: Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,513

(22) Filed: May 15, 2017

(65) Prior Publication Data

US 2017/0338040 A1    Nov. 23, 2017

(30) Foreign Application Priority Data

May 17, 2016 (DE) .................. 10 2016 208 381

(51) Int. Cl.
| | |
|---|---|
| *H01G 4/228* | (2006.01) |
| *H01G 4/40* | (2006.01) |
| *H01G 4/012* | (2006.01) |
| *H01G 4/38* | (2006.01) |
| *H01G 2/22* | (2006.01) |
| *H01G 4/01* | (2006.01) |
| *H01G 4/248* | (2006.01) |
| *H01G 4/005* | (2006.01) |
| *H02M 1/00* | (2006.01) |

(52) U.S. Cl.
CPC ............... *H01G 4/228* (2013.01); *H01G 2/22* (2013.01); *H01G 4/01* (2013.01); *H01G 4/012* (2013.01); *H01G 4/248* (2013.01); *H01G 4/385* (2013.01); *H01G 4/40* (2013.01); *H01G 4/005* (2013.01); *H02M 2001/0048* (2013.01)

(58) Field of Classification Search
None
See application file for complete search history.

(56) References Cited

U.S. PATENT DOCUMENTS

| | | | | |
|---|---|---|---|---|
| 4,502,096 A | * | 2/1985 | Malone | H01G 4/228 29/25.42 |
| 8,416,556 B2 | | 4/2013 | Grimm et al. | |
| 2013/0033913 A1 | * | 2/2013 | Sparka | H01G 4/228 363/132 |
| 2017/0062132 A1 | * | 3/2017 | Weissenborn | H01G 4/005 |
| 2017/0256361 A1 | * | 9/2017 | Yang | H01G 4/33 |

FOREIGN PATENT DOCUMENTS

| | | |
|---|---|---|
| EP | 2728595 A1 | 5/2014 |
| JP | 2010034433 A | 2/2010 |

* cited by examiner

*Primary Examiner* — Dion Ferguson
(74) *Attorney, Agent, or Firm* — Michael Best & Friedrich LLP

(57) ABSTRACT

A capacitor with a first voltage layer guided around the capacitor structure, so that the first voltage layer and the second planar electrode of the capacitor form an overlap region in which the first voltage layer and the second planar electrode are arranged, parallel to one another and separated from one another by a gap, on a base side of the capacitor directly one above the other, wherein the first voltage layer is arranged on an outer side of the second planar electrode, which outer side is averted from the capacitor structure).

12 Claims, 1 Drawing Sheet

CAPACITOR, IN PARTICULAR INTERMEDIATE CIRCUIT CAPACITOR FOR A MULTI-PHASE SYSTEM

BACKGROUND OF THE INVENTION

The invention relates to a capacitor, in particular an intermediate circuit capacitor for a multi-phase system.

In power electronics, multiple electrical networks are energetically coupled in a common DC voltage plane by means of electrical capacitors in an intermediate circuit of converters. On account of the repeated occurrence of switching processes, high, frequency-dependent power losses occur owing to the changing currents in the phases. It is known that planar current guidance and the magnetic interaction between the current-carrying layers with opposing current directions result in a significant reduction in the inductance resulting from the interconnection, and therefore in significantly reduced power losses.

In order to maximize the service life of capacitors in the power electronics, it is necessary to minimize and efficiently dissipate heat which is produced in capacitors.

SUMMARY OF THE INVENTION

The invention proposes a capacitor, in particular an intermediate circuit capacitor for a multi-phase system. Said capacitor comprises a first planar electrode and a second planar electrode which is situated opposite and at a distance from said first planar electrode, and at least one capacitor structure which has at least one dielectric and is arranged between the first planar electrode and the second planar electrode, and a planar first voltage layer which adjoins the first planar electrode in lateral projection, and at least one first pole connection for making electrical contact with the first voltage layer and at least one second pole connection for making electrical contact with the second planar electrode. According to the invention, the first voltage layer is guided around the capacitor structure, so that the first voltage layer and the second planar electrode of the capacitor form an overlap region in which the first voltage layer and the second planar electrode are arranged, parallel to one another and separated from one another by a gap, on a base side of the capacitor directly one above the other, wherein the first voltage layer is arranged on an outer side of the second planar electrode, which outer side is averted from the capacitor structure.

In contrast to the prior art, the capacitor of the invention has the advantage that a very low-inductance connection can be achieved along the capacitor owing to the parallel guidance of the first voltage layer and the second planar electrode in the overlap region. Owing to the plane-parallel guidance of the areas and owing to the opposing current direction, the current paths in the voltage layers are guided close to one another. The effects which are caused by magnetic coupling of the magnetic fields of conductors that are situated close to one another and which can lead to large losses are advantageously compensated for by the current paths which are guided one above the other with opposing current directions. Owing to this advantageously low-inductance construction technique, the total inductance is greatly reduced, this leading to advantageously low losses. Contributions to losses from the planar electrodes, the first voltage layer and the pole connections and also skin effects and proximity effects are reduced by the capacitor according to the invention. Skin effects lead to the current density in the interior of electrical conductors through which alternating current is flowing being lower than in the outer regions. Proximity effects lead to current being restricted or displaced between conductors of alternating currents which are situated close to one another. Therefore, the requirements made of the switching semiconductor switches can also be advantageously reduced as the parasitic inductance of the capacitor reduces when the capacitor is used, for example, as an intermediate circuit capacitor. Furthermore, the electromagnetic compatibility of the structure with respect to other components is advantageously improved.

In addition, the capacitor of the invention has the advantage that the first voltage layer and the second planar electrode of the capacitor, which first voltage layer and second planar electrode are arranged one directly above the other on a base side of the capacitor, can advantageously be cooled when the base side rests on a cooling apparatus, for example a heat sink. This constitutes particularly simple cooling both of the first voltage layer and also of the second planar electrode. Therefore, the first voltage layer can advantageously be cooled before heat can flow, for example, from the first pole connection, via the first voltage layer and the first planar electrode, into the capacitor structure. At the same time, the second planar electrode of the capacitor can therefore advantageously be cooled by means of, for example, the same cooling apparatus, so that, for example, the heat which flows, for example, via the second pole connection to the second planar electrode, into the capacitor structure can also advantageously be reduced. Owing to the simultaneous cooling of the first voltage layer and of the second planar electrode, the total expenditure on removing heat from the capacitor is therefore advantageously reduced, and the, for example, also heat-sensitive capacitor structure is advantageously protected against heat which is introduced via the first pole connection and the second pole connection and the accompanying damage to the capacitor structure. Furthermore, it is therefore advantageously possible for heat loss which is produced, for example, by switching processes, for example, in the first voltage layer, the first planar electrode, the first pole connection, the second planar electrode and/or the second pole connection to, for example, also advantageously be dissipated by means of a cooling apparatus which is arranged on the base side of the capacitor. Owing to cooling of the capacitor on the base side of the capacitor in this way, it is therefore advantageously possible to advantageously reduce the heat which is introduced into the, for example, heat-sensitive capacitor structure, so that heat-sensitive capacitor structures can also be used for example. Owing to the joint cooling of the second planar electrode and of the first voltage layer on the base side of the capacitor, it is advantageously also possible to reduce, for example, the installation space requirement and the costs of the capacitor as well.

The at least one first pole connection, in lateral projection of the first voltage layer, and parallel thereto the at least one second pole connection, in lateral projection of the second planar electrode, advantageously extend beyond the overlap region and in this way form at least one contact-making lug pair which protrudes on the base side of the capacitor. Owing to a contact-making lug pair of this kind, the pole connections can be formed in a particularly cost-effective and simple manner, for example also in one piece with the second planar electrode or the first voltage layer.

It has proven to be particularly advantageous when the first planar electrode and the second planar electrode and the first voltage layer form a receptacle for the inserted capacitor structure in cross section. The capacitor structure can therefore be inserted into the receptacle and in this way advantageously adjusted and protected. If the capacitor structure consists, for example, of a plurality of individual capacitors, said individual capacitors can therefore advantageously be arranged in the receptacle and contact can be made with them and they can be connected in an advantageously simple manner, for example, by the planar electrodes.

In a particularly advantageous exemplary embodiment, the first planar electrode, together with the first voltage layer, exhibits a U-shaped profile in cross section. A U-shaped profile of this kind is advantageously compact and provides an advantageous receptacle for a large number of standard capacitors and has therefore proven particularly advantageous for applications which require a connection of a plurality of capacitors.

In particularly advantageous exemplary embodiments, the at least one first pole connection is arranged at least partially directly above or at least partially directly below the at least one second pole connection. Therefore, the current paths are guided in parallel over a further enlarged region and therefore losses in the capacitor are further reduced.

It has proven to be advantageous when the at least one first pole connection and the at least one second pole connection have the same surface area. Therefore, optimized guidance of the current paths over one another as far as the pole connections is ensured, the total inductance is reduced and the electromagnetic compatibility is improved.

The at least one first pole connection is advantageously formed in a plane of extension of the first voltage layer and/or the at least one second pole connection is formed in a plane of extension of the second planar electrode. This permits simple and economical manufacture of the capacitor according to the invention, and furthermore has the advantage that the pole connections are fitted at easily accessible points on the capacitor and electrical contact can be made with them in a simple manner.

Apart from the at least one first pole connection and the at least one second pole connection, further pole connections of the same kind are particularly advantageously provided, said further pole connections forming, in respective pairs, a further contact-making lug pair, wherein the total number of pole connections is, in particular, a multiple of three, five or six. These exemplary embodiments constitute capacitors with three, five, six or more phase connections, so that they can be used for multiple applications, for example advantageously as intermediate circuit capacitors.

It has proven to be particularly advantageous when an insulation layer is arranged in the gap. Therefore, the first voltage layer is advantageously electrically insulated from the second voltage layer. In order to make the magnetic interaction between the voltage layers as effective as possible, the distance between the voltage layers can be kept as low as possible. To this end, the insulation layer can advantageously also serve, for example, as a spacer between the first voltage layer and the second voltage layer.

In a particularly advantageous exemplary embodiment, the capacitor structure has a height perpendicular to the second planar electrode and, parallel to the second planar electrode, a length of the capacitor structure and a width of the capacitor structure, wherein the height of the capacitor structure is lower than the width of the capacitor structure and the length of the capacitor structure. This produces an advantageously large contact area for heat dissipation when, for example, a cooling device, by means of which heat is removed from the first voltage layer and the second planar electrode in the overlap region for example, is arranged on the base side of the capacitor.

BRIEF DESCRIPTION OF THE DRAWINGS

Exemplary embodiments of the invention are illustrated in the drawing and will be explained in more detail in the following description. In the drawing

DETAILED DESCRIPTION

Figure 1:
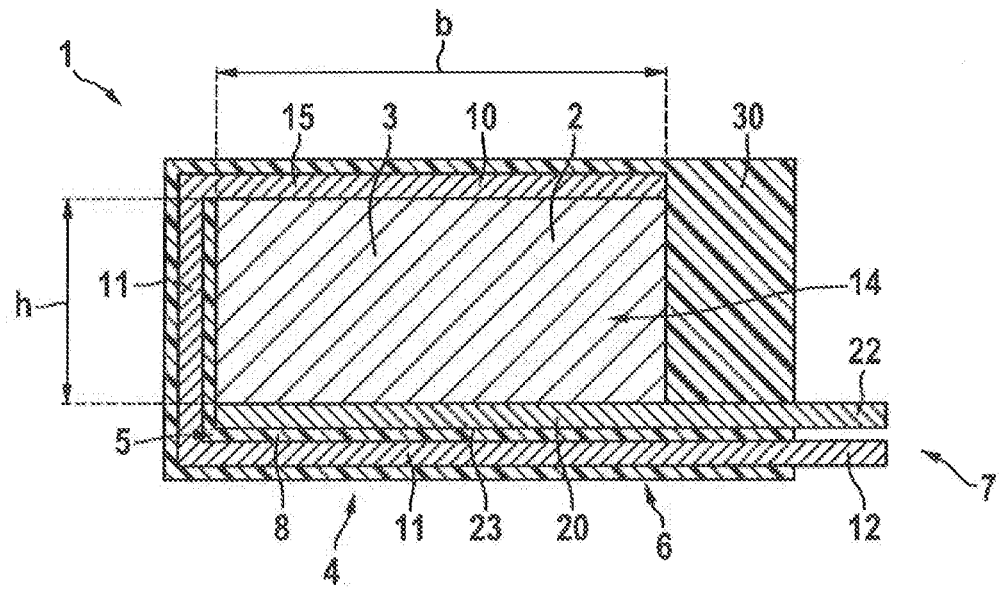
FIG. 1 shows a cross section through an exemplary embodiment of the capacitor according to the invention.

FIG. 1 shows a schematic illustration of an exemplary embodiment of the capacitor 1 according to the invention. The capacitor 1 comprises a first planar electrode 10 and a second planar electrode 20 which is situated opposite and at a distance from said first planar electrode. The planar electrodes 10, 20 are manufactured from electrically conductive material, such as metal for example. The planar electrodes 10, 20 can be of planar form, and manufactured, for example, from metal sheets. A capacitor structure 3 which has at least one dielectric 2 is inserted between the first planar electrode 10 and the second planar electrode 20. In the context of the present application, a capacitor structure 3 is understood to mean to a structure which can form a capacitor together with the first planar electrode 10 and the second planar electrode 20 or which itself forms a capacitor. The capacitor structure 3 can be, for example, a dielectric 2, so that the first planar electrode 10, together with the second planar electrode 20 and the dielectric 2 which is arranged between the first planar electrode 10 and the second planar electrode 20, forms a capacitor. However, the capacitor structure 3 can also consist of one or more capacitors which are arranged between the first planar electrode 10 and the second planar electrode 20, and which can be connected in parallel or in series depending on the intended application, and which can, for example, also be electrically conductively connected, for example welded, to the planar electrodes 10, 20. Various capacitor technologies, such as stacked, cylindrically wound or flat-wound capacitors, can be used as capacitors here. By way of example, the planar electrodes 10, 20 can make electrically conductive contact with said capacitors.

Figure 2:
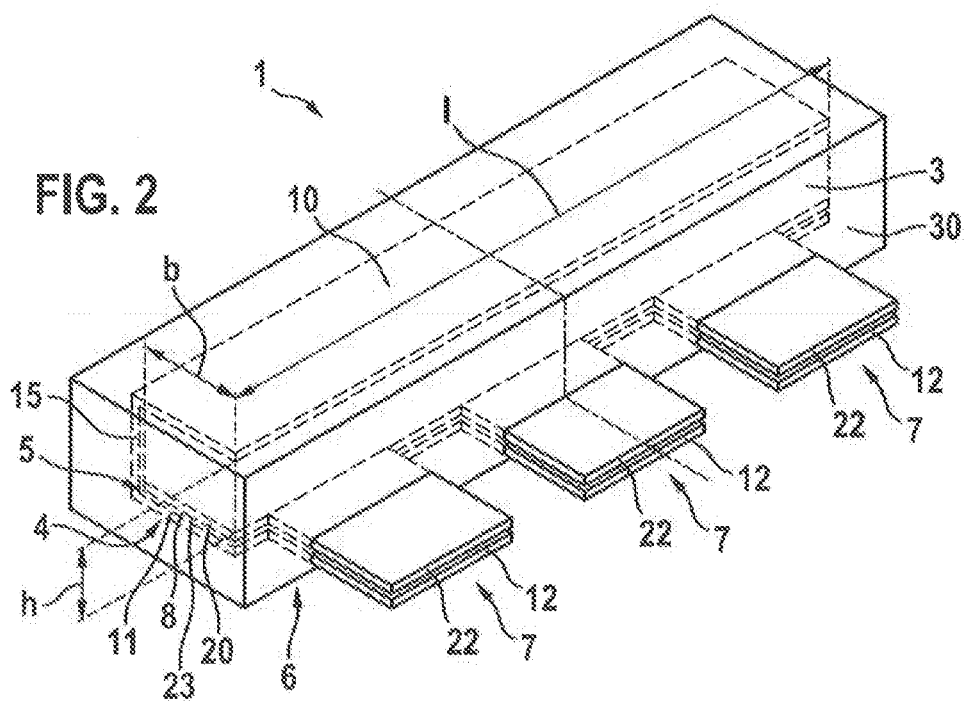
FIG. 2 shows a schematic illustration of the exemplary embodiment of the capacitor according to the invention from FIG. 1.

FIG. 2 schematically illustrates the capacitor structure 3. In this exemplary embodiment, the capacitor structure 3 has a height h perpendicular to the second planar electrode 20. Furthermore, the capacitor structure 3 has a length l parallel to the second planar electrode 20 and also a width b parallel to the planar electrode 20. In this exemplary embodiment, the capacitor structure 3 is schematically illustrated as a cuboid; however, the capacitor structure 3 can also have any other desired shapes. In this exemplary embodiment, the height h of the capacitor structure 3 is smaller than the width b of the capacitor structure 3, and the height h of the capacitor structure 3 is smaller than the length l of the capacitor structure 3. In this exemplary embodiment, this results in a capacitor structure 3 which is arranged in a planar manner between the first planar electrode 10 and the second planar electrode 20. If the capacitor is arranged on the base side 6, for example on a heat sink, heat can therefore be dissipated from the second planar electrode 20 and from the first voltage layer 11 via an advantageously large area on the heat sink.

In this exemplary embodiment, the planar electrodes 10, 20 are of planar form and are arranged parallel to one another. In this exemplary embodiment, the planar electrodes 10, 20 both extend over the entire length l of the capacitor structure 3 and over the entire width b of the capacitor structure 3. As illustrated in FIG. 1, a first voltage layer 11 adjoins the first planar electrode 10 in lateral projection. In this exemplary embodiment, the first voltage layer adjoins an edge of the first planar electrode 10. In this exemplary embodiment, the first voltage layer 11 is manufactured from the same material as the planar electrode 10. The first planar electrode 10 forms an integral component with the first voltage layer 11. The first planar electrode 10, for example together with the first voltage layer 11 too, can be formed as a composite part from various materials. In this exemplary embodiment, the planar electrodes 10, 20 are of plate-like form by way of example. However, in principle, at least minor deviations from the plate shape can also be considered for the planar electrodes 10, 20. The planar electrodes 10, 20 can, for example, also be of multi-layered form. Cutouts, not illustrated in the figures, can also be formed in the planar electrodes 10, 20 by way of example. The first voltage layer 11 is guided around the capacitor structure 3, so that the first voltage layer 11 and the second planar electrode 20 of the capacitor 1 form an overlap region 4. In this exemplary embodiment, the first planar electrode 10 and the first voltage layer 11 form an integral planar component which is bent and therefore is guided around the capacitor structure 3. The first voltage layer 11 and the second planar electrode 20 are arranged parallel to one another and separated from one another by a gap 5 in the overlap region 4. The overlap region 4, in which the first voltage layer 11 and the second planar electrode 20 are arranged parallel to one another and separated from one another by a gap 5, is arranged on a base side 6 of the capacitor 1. There, the first voltage layer 11 and the second planar electrode 20 are arranged one directly above the other. The first voltage layer 11 can, for example, also extend over the overlap region 4. In this exemplary embodiment, the overlap region 4 extends over the entire length l of the capacitor structure 3 and over the entire width b of the capacitor structure 3. In the overlap region 4, recesses or windows, not illustrated in the figures, can, for example, also be provided in the first voltage layer 11, the second planar electrode 20 being accessible through said recesses or windows, and the second planar electrode 20 being able to be connected, for example welded, to capacitors, which form the capacitor structure 3, through said recesses or windows for example. In the context of the present application, an object is understood to mean the first voltage layer 11, a planar electrode 10, 20 or a pole connection 12, 22. If a first object is arranged partially directly below or partially directly above a second object, this is understood in the context of the present application to mean that the first object and the second object are arranged relative to one another in such a way that a vertical projection of the first object onto a projection plane which is arranged plane-parallel to the second object and a vertical projection of the second object onto the projection plane have at least one intersection.

The first voltage layer 11 is arranged on an outer side 23 of the second planar electrode 20, which outer side is averted from the capacitor structure 3. As illustrated in FIG. 1, the first planar electrode 10 and the second planar electrode 20, together with the first voltage layer 11, form a receptacle 14 for the capacitor structure 3 in cross section in this exemplary embodiment. In this exemplary embodiment, as illustrated in FIG. 1, the first planar electrode 10, together with the first voltage layer 11, has a U-shaped profile 15 in cross section. However, in principle, the cross section of the first planar electrode 10 and of the first voltage layer 11 can also have different profiles.

Furthermore, the capacitor 1 comprises at least one first pole connection 12 for making electrical contact with the first voltage layer 11, and at least one second pole connection 22 for making electrical contact with the second planar electrode 20. The first pole connection 12 is, for example, integrally formed with the first voltage layer 11. The second pole connection 22 is, for example, integrally formed with the second planar electrode 20. Therefore, in this exemplary embodiment, as illustrated in FIG. 1, the at least one first pole connection 12 extends in lateral projection of the first voltage layer 11. In this exemplary embodiment, the second pole connection 22 extends in lateral projection of the second planar electrode 20. Therefore, for example, the first pole connection 12, in lateral projection of the first voltage layer 11, extends beyond the overlap region 4, and the second pole connection 22, in lateral projection of the second planar electrode 20, extends beyond the overlap region 4. In this exemplary embodiment, the first pole connection 12 and the second pole connection 22 form a contact-making lug pair 7 which protrudes on the base side 6 of the capacitor 1 (FIG. 1). In this exemplary embodiment, the first pole connection 12 is formed in a plane of extension of the first voltage layer 11, and the second pole connection 22 is formed in a plane of extension of the second planar electrode 20 in this case. As illustrated in FIG. 2, three first pole connections 12 of the same kind and three second pole connections 22 of the same kind are provided in this exemplary embodiment. The first pole connections 12 and the second pole connections 22 in this case form, for example, in respective pairs, a contact-making lug pair 7. In the exemplary embodiment described in this application, the capacitor 1 has three contact-making lug pairs 7. In this exemplary embodiment, the contact-making lug pairs 7 are all arranged on the same side of the second planar electrode 20 and the first voltage layer 11. In this exemplary embodiment, the contact-making lug pairs 7 are lined up over the length l of the capacitor structure 3. However, it is furthermore also possible for a different number of contact-making lug pairs 7 to be formed and for the contact-making lug pairs 7 to be arranged at different points on the capacitor 1.

In this exemplary embodiment, the first pole connection 12 is arranged at least partially directly above or at least partially directly below the at least one second pole connection 22. However, the first pole connection 12 can also be arranged, for example, laterally offset in relation to the second pole connection 22. The pole connections 12, 22 can be of planar form for example. In this exemplary embodiment, as illustrated in FIG. 2, the at least first pole connection 12 and at least one second pole connection 22 have the same surface area.

In this exemplary embodiment, current can flow, for example, from the second pole connection 22, via the second planar electrode 20, to the capacitor structure 3, or current can flow in the opposite direction from the capacitor structure 3, via the second planar electrode 20, to the second pole connection 22. In this exemplary embodiment, current can flow from the first pole connection 12, via the first voltage layer 11 and then via the first planar electrode 10, to the capacitor structure 3 or current can flow in the opposite direction from the capacitor structure 3, via the first planar electrode 10 and then via the first voltage layer 11, to the first pole connection 12 at the same time.

In this exemplary embodiment, an insulation layer 8 is arranged in the gap 5 between the first voltage layer 11 and the second planar electrode 20. The insulation layer 8 is manufactured from an electrically insulating material and can be arranged, for example, only in the overlap region 4 between the first voltage layer 11 and the second planar electrode 20. However, the insulation layer 8 can also protrude beyond the overlap region 4 of the first voltage layer 11 and the second planar electrode 20. The insulation layer can also extend, for example, to the intermediate space between the first pole connection 12 and second pole connection 22, which respectively form a contact-making lug pair 7, to electrically insulate the first pole connection 12 from the second pole connection 22. In order to make the magnetic interaction between the first voltage layer 11 and the second voltage layer 21 as effective as possible, the gap 5 between the voltage layers can be kept as small as possible. Therefore, the insulation layer 8 can serve as a spacer between the first voltage layer 11 and the second planar electrode 20. The capacitor structure 3, together with the first planar electrode 10, the first voltage layer 11 and the second planar electrode 20, can, as illustrated in FIG. 1, also be embedded in a housing 30. As in the exemplary embodiment illustrated in FIG. 1, the housing 30 can also comprise the insulation layer 8 and be integrally formed, for example, with insulation layer 8. In the exemplary embodiment illustrated in FIG. 1, the housing 30 encloses the capacitor structure 3 in such a way that the capacitor structure 3 is surrounded by the housing 30 on all sides and, for example, only the first pole connection 12 and the second pole connection 22 protrude out of the housing 30 in an outer region of the housing 30. In this outer region of the housing 30, the pole connections 12, 22 can then be electrically connected, for example, to electrical and/or electronic components, not illustrated in the figures, which are arranged outside the capacitor 1.

It goes without saying that further exemplary embodiments and mixed forms of the illustrated exemplary embodiments are also possible.

What is claimed is:

1. A capacitor (1) comprising
   a first planar electrode (10) and a second planar electrode (20) which is situated opposite and at a distance from said first planar electrode,
   at least one capacitor structure (3) which has at least one dielectric (2) and is arranged between the first planar electrode (10) and the second planar electrode (20),
   a planar first voltage layer (11) which adjoins the first planar electrode (10),
   at least one first pole connection (12) in electrical contact with the first voltage layer (11), and
   at least one second pole connection (22) in electrical contact with the second planar electrode (20),
   wherein the first voltage layer (11) is positioned around two sides of the capacitor structure (3), so that a portion of the first voltage layer (11) and the second planar electrode (20) of the capacitor (1) form an overlap region (4) in which the first voltage layer (11) and the second planar electrode (20) are parallel to one another and separated from one another by a gap (5) on a base side (6) of the capacitor (1), wherein the first voltage layer (11) is arranged on an outer side (23) of the second planar electrode (20), which outer side is averted from the capacitor structure (3).

2. The capacitor according to claim 1, characterized in that the at least one first pole connection (12), in lateral projection of the first voltage layer (11), and parallel thereto the at least one second pole connection (22), in lateral projection of the second planar electrode (20), extend beyond the overlap region (4) and in this way form at least one contact-making lug pair (7) which protrudes on the base side (6) of the capacitor (1).

3. The capacitor according to claim 1, characterized in that the first planar electrode (10) and the second planar electrode (20) and the first voltage layer (11) form a receptacle (14) for the inserted capacitor structure (3) in cross section.

4. The capacitor according to claim 1, characterized in that the first planar electrode (10), together with the first voltage layer (11), exhibits a U-shaped profile (15) in cross section.

5. The capacitor according to claim 1, characterized in that the at least one first pole connection (12) is arranged at least partially directly above or at least partially directly below the at least one second pole connection (22).

6. The capacitor according to claim 1, characterized in that the at least one first pole connection (12) and the at least one second pole connection (22) have the same surface area.

7. The capacitor according to claim 1, characterized in that the at least one first pole connection (12) is formed in a plane of extension of the first voltage layer (11) and/or the at least one second pole connection (22) is formed in a plane of extension of the second planar electrode (20).

8. The capacitor according to claim 1, characterized in that, apart from the at least one first pole connection (12) and the at least one second pole connection (22), further pole connections (12, 22) of the same kind are provided, said further pole connections forming, in respective pairs, a further contact-making lug pair (7).

9. The capacitor according to claim 1, characterized in that, apart from the at least one first pole connection (12) and the at least one second pole connection (22), further pole connections (12, 22) of the same kind are provided, said further pole connections forming, in respective pairs, a further contact-making lug pair (7), wherein the total number of pole connections (12, 22) is a multiple of three, five or six.

10. The capacitor according to claim 1, characterized in that an insulation layer (8) is arranged in the gap (5).

11. The capacitor according to claim 1, characterized in that the capacitor structure (3) has a height (h) perpendicular to the second planar electrode (20) and, parallel to the second planar electrode (20), a length (l) of the capacitor structure (3) and a width (b) of the capacitor structure (3), wherein the height (h) of the capacitor structure (3) is lower than the width (b) of the capacitor structure (3) and the length (l) of the capacitor structure (3).

12. An intermediate circuit capacitor for a multi-phase system, the capacitor (1) comprising
   a first planar electrode (10) and a second planar electrode (20) which is situated opposite and at a distance from said first planar electrode,
   at least one capacitor structure (3) which has at least one dielectric (2) and is arranged between the first planar electrode (10) and the second planar electrode (20),
   a planar first voltage layer (11) which adjoins the first planar electrode (10),
   at least one first pole connection (12) in electrical contact with the first voltage layer (11), and
   at least one second pole connection (22) in electrical contact with the second planar electrode (20),
   wherein the first voltage layer (11) is positioned around two sides of the capacitor structure (3), so that a portion of the first voltage layer (11) and the second planar electrode (20) of the capacitor (1) form an overlap region (4) in which the first voltage layer (11) and the second planar electrode (20) are parallel to one another and separated from one another by a gap (5) on a base side (6) of the capacitor (1), wherein the first voltage layer (11) is arranged on an outer side (23) of the second planar electrode (20), which outer side is averted from the capacitor structure (3).

* * * * *